United States Patent [19]

Alber

[11] Patent Number: 4,478,247

[45] Date of Patent: Oct. 23, 1984

[54] FLUID COUPLING FOR HOLLOW ROTARY MEMBER

[76] Inventor: Franz Alber, Plattlgasse 12, Wien 23, Austria

[21] Appl. No.: 342,394

[22] Filed: Jan. 25, 1982

[30] Foreign Application Priority Data

Jan. 26, 1981 [AT] Austria .................................. 324/81

[51] Int. Cl.³ .............................................. E03B 1/00
[52] U.S. Cl. ..................................... 137/580; 165/89; 277/9.5
[58] Field of Search .................... 425/378; 264/328.14; 165/89; 285/134, 176, 190, DIG. 19; 277/59, 179, 9.5, 9.9, 217; 418/94; 29/450; 137/580

[56] References Cited

U.S. PATENT DOCUMENTS

| | | | |
|---|---|---|---|
| 1,078,952 | 11/1913 | Prellwitz | 285/190 |
| 1,925,898 | 9/1933 | Fritz | 29/450 |
| 1,965,876 | 7/1934 | Bettis | 29/450 |
| 2,038,840 | 4/1936 | Hall | 29/450 |
| 2,516,191 | 7/1950 | Englesson | 29/450 |
| 2,725,621 | 12/1955 | Gates | 29/450 |
| 2,883,224 | 4/1959 | Riesing et al. | 277/179 |
| 3,302,698 | 2/1967 | Edwards | 165/89 X |
| 3,638,606 | 2/1972 | Pieber et al. | 165/89 X |
| 3,818,982 | 6/1974 | Wanger | 165/89 |
| 3,908,695 | 9/1975 | Dunbar | 137/580 |
| 4,252,147 | 2/1981 | Gerber et al. | 137/580 |

FOREIGN PATENT DOCUMENTS 2365149  9/1974  Fed. Rep. of Germany .
 313831  6/1956  Switzerland .

OTHER PUBLICATIONS

"Extruder-Bauelemente", pp. 703 and 704, Nov. 1963, (German publication).

*Primary Examiner*—William R. Cline
*Attorney, Agent, or Firm*—Karl F. Ross; Herbert Dubno

[57] ABSTRACT

A hollow rotary member such as a roller, extruder or the like, requiring constant temperature control by a fluid circulating therethrough, has a hollow shaft with radial inlet and outlet ports communicating with respective compartments of a stationary coupling sleeve surrounding same, the compartments being bounded by sealing rings engaging the shaft. In order to facilitate the introduction of the shaft into the sleeve without damage to the sealing rings, the shaft ends in an extremity of reduced cross-sectional area whose noncircular outline consists of convex sections smoothly merging into one another.

5 Claims, 2 Drawing Figures

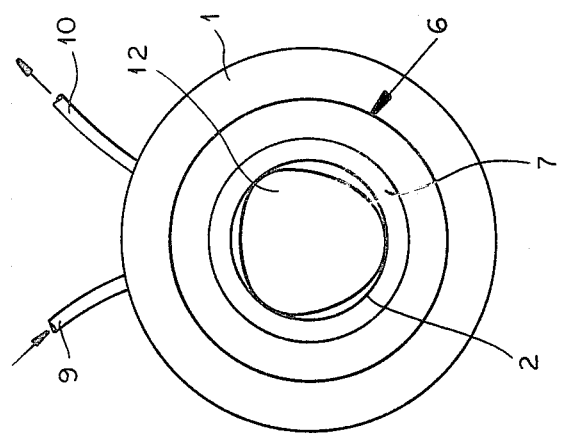
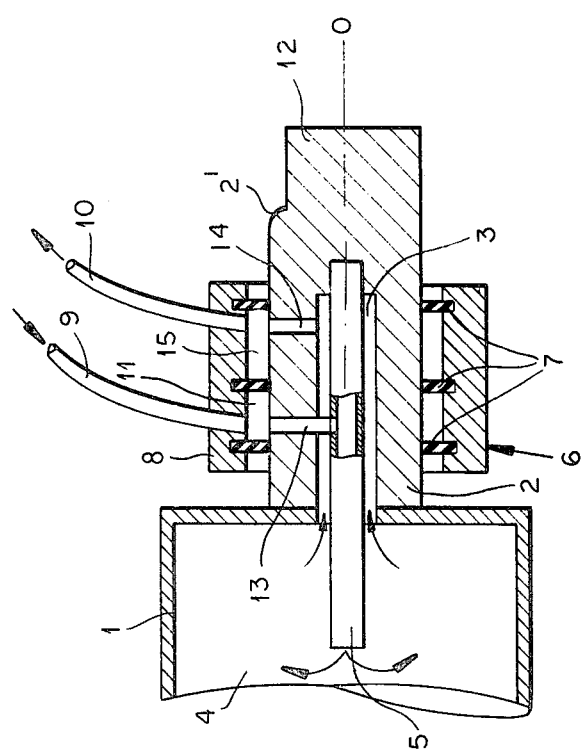
FIG.2
FIG.1

FLUID COUPLING FOR HOLLOW ROTARY MEMBER

FIELD OF THE INVENTION

My present invention relates to a coupling facilitating the circulation of a temperature-controlling fluid through a hollow rotary member.

BACKGROUND OF THE INVENTION

Machines for extruding or otherwise processing plastic materials, for example, have components such as rollers, worms or the like which must be continuously heated in order to prevent premature hardening of the polymeric mass. In other instances a rotating cylinder or drum has to be continuously cooled. Since the heating or cooling fluid is usually supplied by a stationary source, suitable seals must be provided at the inlet end and in most cases also at the outlet end of the channel system of the rotary member. Frequently, these inlet and outlet ends are constituted by lateral ports of a shaft integral with the member whose temperature is to be fluidically controlled, the ports communicating with respective compartments formed in an annular clearance between the shaft and a surrounding stationary coupling sleeve with the aid of sealing rings of rubber or the like carried by that sleeve. In order to minimize leakage, the rings must fit tightly on the shaft and may suffer damage when the sleeve is pushed onto the free shaft end during assembly. That risk is not completely avoided by tapering the shaft extremity, apparently because local peripheral stresses cannot be properly equalized.

OBJECT OF THE INVENTION

The object of my present invention, accordingly, is to provide means for avoiding this difficulty in the assembly of a rotary coupling of the type referred to.

SUMMARY OF THE INVENTION

I have found, in accordance with this invention, that the problem can be solved by designing the free end of a channeled shaft of a rotary member as an extremity of reduced cross-sectional area with a noncircular outline formed from convex sections which merge smoothly into one another and whose maximum distance from the shaft axis is equal to or less than the shaft radius, this extremity being joined to adjacent shaft portions by rounded transition zones so as to avoid any discontinuities which could cut into the inner periphery of a sealing ring passing thereover.

Particularly good results are achieved if the outline of this shaft extremity has two or more lobes—preferably three —whose maximum distance from the axis of the shaft substantially equals its radius so that the sealing rings are already aligned with the shaft periphery at their points of engagement with these lobes. The outline may be an epitrochoid, for example, or an ellipse whose major axis approaches or equals the shaft diameter. Even more advantageous is the use of a constant-diameter trilobe which, like the ellipse, is of convex curvature all around the shaft axis.

BRIEF DESCRIPTION OF THE DRAWING

The above and other features of my invention will now be described in detail with reference to the accompanying drawing in which:

FIG. 1 is an axial sectional view of part of a hollow rotary cylinder provided with a fluid coupling according to my invention; and FIG. 2 is an end view of the assembly of FIG. 1.

SPECIFIC DESCRIPTION

FIG. 1 shows part of a hollow cylinder or drum 1 rigid with a shaft 2 which has an axial bore 3 opening into the interior 4 of the drum. A central tube 5 occupies part of bore 3 so as to leave an annular channel between itself and the body of shaft 2. The shaft and the drum are rotated about their axis 0 by a non-illustrated belt, gear or chain drive, e.g. via another shaft on the remote end of the drum.

A fluid coupling 6, designed to circulate a temperature-controlling liquid (e.g. hot oil) through the interior 4 of drum 1, comprises a stationary sleeve 8 coaxially surrounding the shaft 2 with formation of an annular clearance therebetween. This clearance is subdivided into an inlet compartment 11 and an outlet compartment 15 by three sealing rings 7 of elastomeric material tightly engaging the shaft 2 to prevent leakage of heating fluid. Compartment 11 receives oil via a conduit 9 from the high-pressure side of a nonillustrated pump, the oil being heated by conventional means also not shown. The low-pressure side of the pump is connected to compartment 15 through a conduit 10. A pipe 13 traversing a radial port of shaft 2 links the inlet compartment 11 with the interior of tube 5 while the surrounding channel communicates with outlet compartment 15 by way of another radial port 14.

In order to facilitate the assembly of rotary member 1, 2 and coupler 6, the free end of shaft 2 is reduced in its cross-sectional area to form an extremity 12 with a constant-diameter trilobate outline. The lobes of extremity 12 are tangent to the extended peripheral surface of the main body of shaft 2 while the intervening lands, still convex, are faired into the shaft surface by rounded steps 2'.

During assembly, each deformable sealing ring 7 is easily fitted onto the reduced shaft extremity, even by unskilled personnel, with enough slack to allow for the equalization of local stresses. It can then be safely shoved over the rounded steps or shoulders 2' into the working position shown in the drawing.

The reduced extremity 12 can be readily shaped by milling or grinding the free shaft end.

If needed, shaft 2 may be supported by a journal bearing juxtaposed with sleeve 8.

I claim:

1. In combination, a hollow rotary member provided with a shaft having a bore communicating with the interior of said member, and a stationary coupling sleeve coaxially surrounding said shaft with annular clearance, said sleeve beng internally provided with a plurality of elastomeric sealing rings engaging said shaft and bounding at least one compartment within said clearance communicating with said bore through a lateral port of said shaft and further communicating with an external conduit carrying a temperature-controlling fluid circulated through said member by way of said bore, said shaft having a free end constituted by an integral extremity of reduced cross-sectional area and limited axial length with a noncircular outline formed from convex sections merging smoothly and without peripheral discontinuities into one another, the maximum distance of said sections from the shaft axis beng at most equal to the radius of said shaft, said extremity being joined to adjacent shaft portions by rounded transition zones enabling said sealing rings to be safely fitted onto the shaft from said free end during assembly.

2. The combination defined in claim 1 wherein said outline is of convex curvature all around said axis.

3. The combination defined in claim 2 wherein said outline has at least two lobes whose maximum distance from the axis substantially equals said radius.

4. The combination defined in claim 3 wherein said outline is a constant-diameter trilobe.

5. The combination defined in claim 1, 2, 3 or 4 wherein said sealing rings define an inlet compartment and an outlet compartment in said annular clearance, said bore being one of two channels in said shaft each communicating with one of said compartments through a respective port.

* * * * *